(12) United States Patent
Takatsu

(10) Patent No.: US 8,280,044 B2
(45) Date of Patent: Oct. 2, 2012

(54) STREAM ENCRYPTION METHOD AND ENCRYPTION SYSTEM

(75) Inventor: Motomu Takatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 478 days.

(21) Appl. No.: 12/492,841

(22) Filed: Jun. 26, 2009

(65) Prior Publication Data
US 2010/0008497 A1    Jan. 14, 2010

Related U.S. Application Data

(63) Continuation of application No. PCT/JP2006/326109, filed on Dec. 27, 2006.

(51) Int. Cl.
*H04L 9/00* (2006.01)
(52) U.S. Cl. ............... 380/42; 380/40; 380/268
(58) Field of Classification Search ............ 708/145; 380/255, 265, 271, 277, 46, 44, 42, 38, 37, 380/40, 43, 268
See application file for complete search history.

(56) References Cited

U.S. PATENT DOCUMENTS

| | | | |
|---|---|---|---|
| 6,307,940 B1 * | 10/2001 | Yamamoto et al. | 380/277 |
| 6,683,953 B1 * | 1/2004 | Kasahara et al. | 380/28 |
| 6,804,355 B1 * | 10/2004 | Graunke | 380/37 |
| 7,113,597 B2 * | 9/2006 | Myers | 380/201 |
| 7,177,424 B1 * | 2/2007 | Furuya et al. | 380/37 |
| 7,190,787 B1 * | 3/2007 | Graunke et al. | 380/42 |
| 2002/0166058 A1 * | 11/2002 | Fueki | 713/194 |
| 2003/0108195 A1 * | 6/2003 | Okada et al. | 380/37 |
| 2004/0083376 A1 * | 4/2004 | Myers | 713/193 |
| 2004/0252836 A1 * | 12/2004 | Yoshida et al. | 380/268 |
| 2005/0084110 A1 * | 4/2005 | Palmer | 380/268 |
| 2006/0098820 A1 * | 5/2006 | Chang et al. | 380/46 |
| 2006/0239296 A1 * | 10/2006 | Jinzaki et al. | 370/468 |

FOREIGN PATENT DOCUMENTS

| | | |
|---|---|---|
| JP | 60-032453 A | 2/1985 |
| JP | 2006-080720 A | 3/2003 |

OTHER PUBLICATIONS

G. A. Barbosa, "Fast and secure key distribution using mesoscopic coherent states of light", Phys. Rev. A 68, 052307 (2003).

* cited by examiner

*Primary Examiner* — Kim Vu
*Assistant Examiner* — Sayed Beheshti Shirazi
(74) *Attorney, Agent, or Firm* — Fujitsu Patent Center

(57) ABSTRACT

A stream encryption method encodes plaintext of N number of 1-bit input signal sequences into L (L is N or more) bits of encrypted text using N number of pseudo random sequences and uses only one pseudo random sequence used for the encryption to decode the single corresponding plaintext. This stream encryption method comprises using the N number of pseudo random sequences to divide a L-bit encryption symbol set averagely into two equal parts; selecting either of the two partial sets by a corresponding 1-bit plaintext sequence; and when there are one or more elements of the selected N number of partial sets forming common parts in the sets, using one of those as an encryption symbol.

10 Claims, 8 Drawing Sheets

RELATED ART

STREAM ENCRYPTION METHOD AND ENCRYPTION SYSTEM

CROSS REFERENCE TO RELATED APPLICATION

This application is a continuation application and is based upon PCT/JP2006/326109, filed on Dec. 27, 2006.

FIELD

The embodiments disclosed in this application relate to a stream encryption method and encryption system.

BACKGROUND

In the past, for example, for securely transmitting information and protecting intellectual property, it has been requested to restrict access information to only limited persons. Usually, this is realized by using encryption.

In transmitting information by encryption, the sender of the information and the legitimate receiver have to know in advance separate information not known to a third party. This information is called the "encryption key".

In general, as an encryption method (system), the common key encryption method in which the key used by the sender for encryption (encoding) and the key used by the receiver for decoding are the same and the public key encryption method in which special keys called a public key and secret key are used have been known.

First, the public key encryption method has the advantage of ease of distribution of the key, but has the problem of a large amount of processing necessary for encryption. Further, a public key and a secret key have a certain relationship. The security is based on the fact that with current computers and processing algorithms, it would take tremendous processing time to obtain the secret key from the public key and therefore this would be substantially impossible, so there is the possibility of the discovery of a new algorithm etc. causing security to be impaired.

On the other hand, the common key encryption method has the problem of difficult secure distribution of the secret key, but less processing, so can be used for high speed communication. Therefore, public key encryption is often used for distribution of the secret key, while common key encryption is often used for communication of actual information.

The common key encryption method includes the block encryption method of dividing the information (plaintext) desired to be sent into blocks of a certain length and using the same secret key for each block for encryption and the stream encryption method of using a secret key to generate a pseudo random sequence and using this pseudo random sequence to encrypt the plaintext for each bit.

FIG. 1 is a block diagram for explaining an example of the conventional stream encryption method. As illustrated in FIG. 1, in one example of the conventional stream encryption method, for example, the sending side uses the secret key as a starting point for random number generation so as to generate a pseudo random sequence and uses that pseudo random sequence to encrypt the plaintext to generate encrypted text. Specifically, for example, it obtains the XOR of the pseudo random sequence "01011001" and plaintext "00110101" for each bit so as to generate the encrypted text "01101100" and sends the encrypted text through a channel to the receiving side.

The receiving side obtains the XOR of the encrypted text "01101100" and pseudo random sequence "01011001" sent for each bit to obtain the original plaintext "00110101".

In this way, the conventional stream encryption method, for example, uses a secret key as a starting point for random number generation so as to generate a pseudo random sequence and obtains the XOR for each bit of the pseudo random sequence and plaintext so as to generate encrypted text.

Therefore, if it were possible to obtain part of the plaintext corresponding to the encrypted text, it would become possible to obtain part of the pseudo random sequence. Here, a random number generator determines the random sequence unambiguously if the current internal status is determined, so if that internal status could be deduced from part of a pseudo random sequence ending up in the hands of an eavesdropper, the encrypted text would end up being completely decoded.

Therefore, the ease of deduction of the internal status from part of a pseudo random sequence determines the security. Therefore, a random number generator of a simple configuration such as a linear feedback type shift register may not be used at all in practice. One having a complicated configuration having non-linearity has to be used.

In this regard, even if part of the plaintext ends up becoming known to an eavesdropper, if it were difficult to determine the pseudo random sequence from that, the danger of the internal status of the random number generator ending up becoming known will be able to be reduced. As a technique based on this idea, physical noise or a physical random number is sometimes added for the encryption.

FIG. 2 is a block diagram for explaining another example of a conventional stream encryption method and illustrates a stream encryption method designed so that even if information of the plaintext is known, the information of a random number will not be unambiguously learned.

As illustrated in FIG. 2, in another example of the conventional stream encryption method, the sending side adds the physical random number (physical noise) "01" to the plaintext "0", uses a pseudo random sequence to jumble it and generate encrypted text "010", and sends this through a channel to the receiving side.

The receiving side performs processing on the encrypted text "010" reverse to the jumbling performed using the pseudo random sequence at the sending side (jumbling$^{-1}$) to obtain the plaintext "0".

In another example of this conventional stream encryption method, to prevent information of a pseudo random number from being unambiguously learned even if information of the plaintext is known, a physical random number or physical noise is added to obtain the encrypted text, so the amount of information of the encrypted text has to be larger than the amount of information of the plaintext.

Therefore, when transmitting information by a binary signal, it is requested to assign the encrypted text a larger number of bits than the plaintext. A drop in the encoding rate is unavoidable. Furthermore, in analog (multivalue) transmission, it is possible to transmit data without causing a drop in the data rate, but the requested S/N ratio becomes larger, so the capacity of the communication channel also has to be increased. This is no different from a drop in the actual encoding rate.

In this regard, in the past, as a time-division multiplex communication system preventing divulgence of content of a data signal to a station other than the corresponding sending and receiving stations, one designed to obtain an XOR of an M-sequence signal differing between the sending and receiving stations and the data signal, then send the information has been proposed (for example, see Japanese Laid-Open Patent Publication No. 60-032453). However, in this methods the individual data are independently encrypted. This does not mean combining a large number of data for the encryption to enhance secrecy of the communication.

Further, as an example of encryption using the above physical noise, in the past an encryption method using quantum noise of laser light (coherent light) for analog transmission so as to enhance secrecy (Y-00) has also been proposed (for example, see G. A. Barbosa, "Fast and secure key distribution using mesoscopic coherent states of light", Phys. Rev. A 68, 052307 (2003)).

SUMMARY

According to an aspect of the present embodiments, there is provided a stream encryption method encoding plaintext of N number of 1-bit input signal sequences to L (L is N or more) bits of encrypted text using N number of pseudo random sequences and using only one pseudo random sequence used for that encryption so as to decode the corresponding single plaintext.

The stream encryption method comprises using the N number of pseudo random sequences (independently for each pseudo random number) to divide a L-bit encryption symbol set averagely into two equal parts; selecting either of the two partial sets by a corresponding 1-bit plaintext sequence; and using one of those as an encryption symbol, when there are one or more elements of the selected N number of partial sets forming common parts in the sets.

The object and advantages of the embodiments will be realized and attained by means of the elements and combinations particularly pointed out in the appended claims.

It is to be understood that both the foregoing general description and the following detailed description are exemplary and explanatory and are not restrictive of the embodiments, as claimed.

DESCRIPTION OF EMBODIMENTS

First, as explained above, the stream encryption method is advantageous for high speed communication since the amount of processing involved is smaller than with the block encryption method. In this stream encryption method, if the plaintext for part of the encrypted text ends up being learned by an eavesdropper (known plaintext attack), part of the pseudo random sequence will be learned by the eavesdropper. The difficulty of deducing the original secret key (starting point for pseudo random sequence) from part of the random sequence becomes a measure of the security. However, there is the problem that this technique for evaluating security may not be established with respect to the block encryption method.

Further, as explained above, as art for improving the security of the stream encryption method, the technique has also been proposed of adding a physical random number (noise) to the actual information desired to be sent so as to encrypt it and thereby make it difficult to deduce a pseudo random sequence by a known plaintext attack and enhance security. If suitably using this technique, enhancement of security will be fully possible, but there is the problem that since the information of the physical random number is also sent, multi-bit transmission becomes requested or a drop in the encoding rate may be avoided.

As such a method, in the past, an encryption method called the "Y-00 method" using both a pseudo random number and a physical random number has also been proposed. In this Y-00 method, even with the known plaintext attack, an eavesdropper may not obtain the correct pseudo random sequence. Deduction of the internal status of the pseudo random number generator is difficult, so this is considered a more secure encryption method than the usual stream encryption.

However, in the Y-00 method, the number of the symbols transmitted for 1 bit of plaintext is a large one of 4 to 2000 or so, so there are the problems that the encoding rate is low and the efficiency of utilization of the channel capacity is low.

The present embodiments, in consideration of the problems of the above conventional encryption techniques, have as its object the provision of a stream encryption method and encryption system enabling security to be enhanced against known plaintext attacks without causing a remarkable drop in the encoding rate of the encryption.

Next, the aspect of the stream encryption method according to the embodiments will be explained with reference to FIG. 3. The aspect of the embodiments encrypts a plurality of independent plaintexts all together to thereby cause an action similar to a physical random number on the information of other plaintext and make deduction of the pseudo random sequence difficult while avoiding a drop in the encoding rate.

Figure 1:
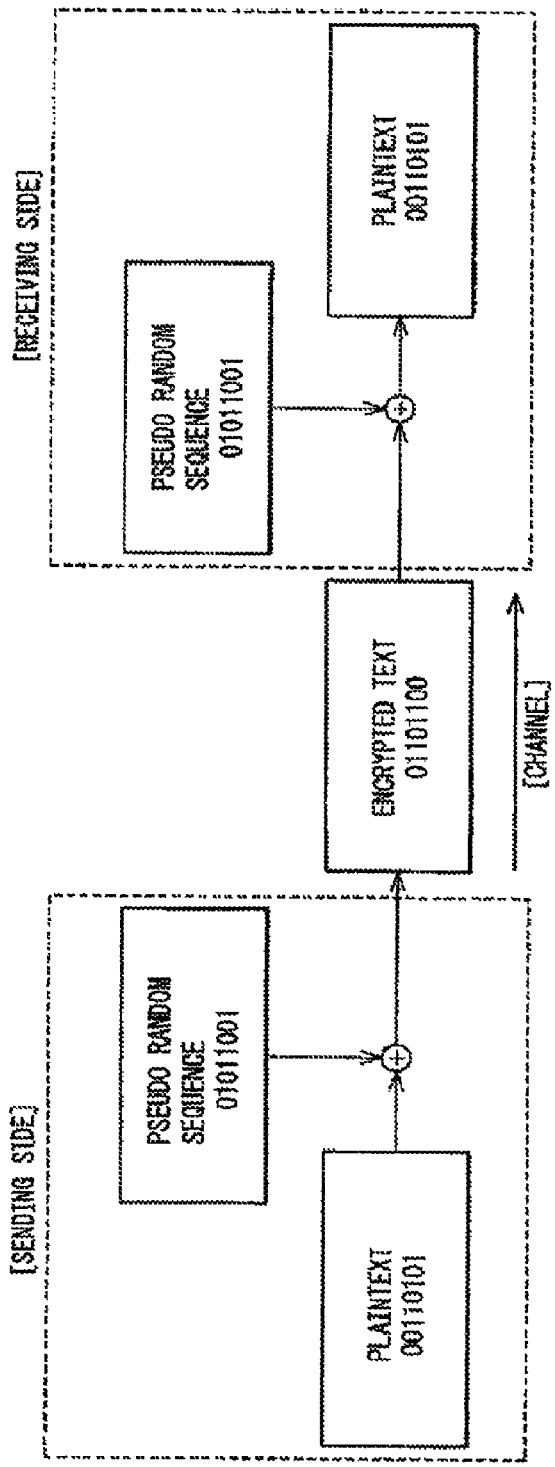
FIG. 1 is a block diagram for explaining an example of a conventional stream encryption method.
Figure 2:
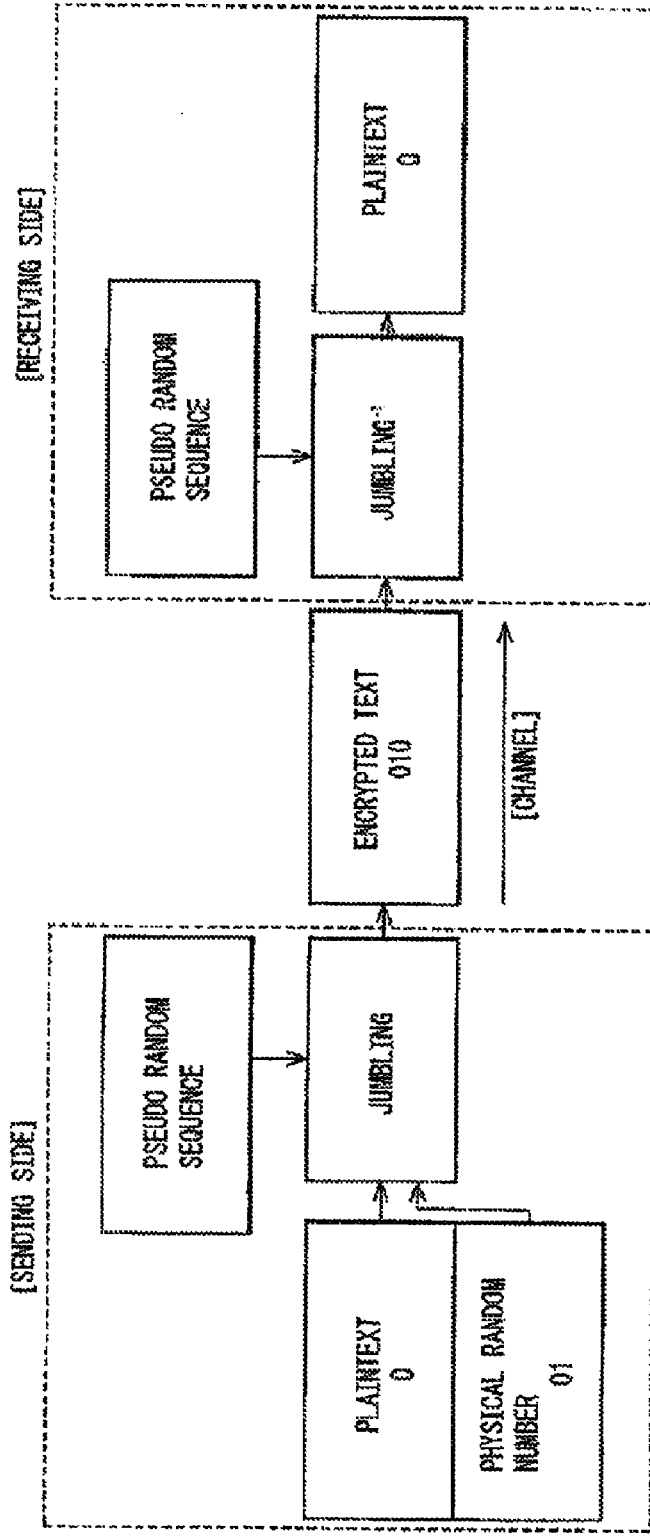
FIG. 2 is a block diagram for explaining another example of a conventional stream encryption method.
Figure 3:
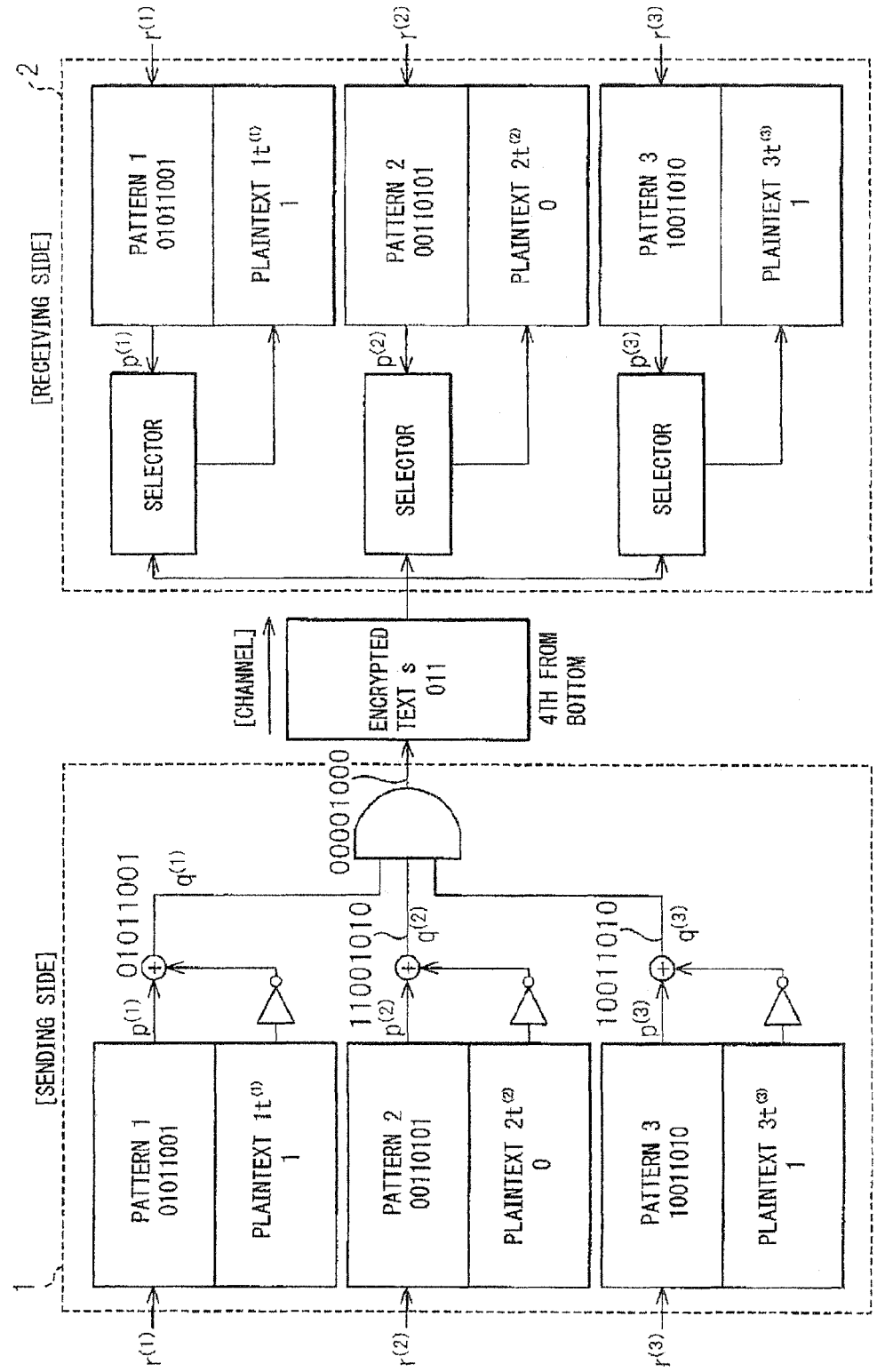
FIG. 3 is a block diagram for explaining an aspect of the present embodiments of the stream encryption method.

FIG. 3 is a block diagram for explaining an aspect of the present embodiments of the stream encryption method and illustrates the case of obtaining L bits of encrypted text from N number of 1-bit plaintext. Note that for the explanation, the logical route over which a signal for each plaintext sequence is transmitted will be called a "channel" and each assigned a number c of 1 to N. Before the encryption and after the decoding, each channel is independent, but at the time of encryption, these are merged and the information of the channels is sent mixed together. Further, for each channel, a pseudo random sequence $r^{(c)}$ is independently used. The same sequence generated by a common key is used in the encryption and decoding.

First, in the encryptor, as described below, a $2^L$-bit bit pattern unambiguously determined by a pseudo random sequence $r^{(c)}$ is generated for each channel.

$$p^{(c)} = \{p_0^{(c)}, p_1^{(c)}, p_2^{(c)}, p_3^{(c)}, \ldots, p_{2^L-1}^{(c)}\} \quad \text{[Equation 1]}$$

Further, as described next, according to whether the plaintext $t^{(c)}$ of the channel is "0" or "1", it is determined whether to apply that bit pattern as it is or apply it inverted:

$$q^{(c)} = \{q_0^{(c)}, q_1^{(c)}, q_2^{(c)}, q_3^{(c)}, \ldots, q_{2^L-1}^{(c)}\}, q_i^{(c)} = p_i^{(c)} \oplus t^{(c)} \quad \text{[Equation 2]}$$

Furthermore, as described next, the AND of each bit of the bit pattern $q^{(c)}$ for all the obtained channels is calculated:

$$x = \{x_0, x_1, x_2, x_3, \ldots, x_{2^L-1}\}, x_i = \prod_{c=0}^{N-1} q_i^{(c)} \quad \text{[Equation 3]}$$

That is, at the encryptor 1 (sending side), for example, as illustrated in FIG. 3, $t^{(1)}$ of the plaintext 1 is "1", $t^{(2)}$ of the plaintext 2 is "0", and $t^{(3)}$ of the plaintext 3 is "1", so the bit pattern (pattern) $p^{(1)}$ "01011001" of the plaintext 1 is used as it is as $q^{(1)}$ "01011001", the pattern $p^{(2)}$ "00110101" of the plaintext 2 is used inverted as $q^{(2)}$ "11001010", and the pattern $p^{(3)}$ "10011010" of the plaintext 3 is used as it is as $q^{(2)}$ "10011010". Here, for example, in the pattern $p^{(1)}$ "01011001" of the plaintext 1, the bits of data become as follows: $p_0^{(1)}$ "0", $p_1^{(1)}$ "1", $p_2^{(1)}$ "10", $p_3^{(1)}$ "1", $p_4^{(1)}$ "1", $p_5^{(1)}$ "0", $p_6^{(1)}$ "0", and $p_7^{(1)}$ "1".

Further, if there is a bit where the result of calculation of the AND is "1", that bit number (0 to $2^L-1$) is made the encrypted text S "00001000". At this time, $q_s^{(c)}=1 \rightarrow p_s^{(c)}=t_s^{(c)}$ stands. Note that when there are a plurality of bits of "1", it is possible to use any one of those. The thus generated encrypted text S is sent to the receiving side where it is decoded by the decoder 2.

At the decoder 2 (receiving side), the same pseudo random sequence $r^{(c)}$ is used to generate the same bit pattern $p^{(c)}$ and the value of the bit number designated by the encrypted text S is used to obtain the plaintext $t^{(c)}$.

Here, when x does not have even one "1" bit, encryption fails and error is caused, but various ways for dealing with this may be considered as explained later. Further, the case where the number of bits L of the encryption symbols s is fixed was explained, but L can also be made variable.

In the above stream encryption method, a binary bit pattern was used as $p^{(c)}$, but when using a ternary (for example, "−1", "0", and "1") pattern, when the plaintext $t^{(c)}$ is "0", a bit number giving "−1" is used, while when it is "1", a bit number giving "1" is used as much as possible, but if this is not possible, then there is also the method of using a bit expressing "0". In this case, it becomes possible to make just a specific channel idle (lose data) without affecting other channels much. Note that the above explanation is simply given to explain the aspect of the embodiments. In actuality, when applying the aspect of the embodiments, sometimes a simpler configuration having similar functions may be switched to.

In this way, in the stream encryption method of the aspect of the present embodiments, information of a specific channel is not embedded in a specific location (bit) of the L bits of encryption symbols obtained as a result. It is determined by the interrelationship between the plaintext and pseudo random numbers of a plurality of channels.

Therefore, even if an eavesdropper knows part of the plaintext for a specific channel, the only thing he can learn about the pseudo random sequence is the information for one bit in the bit pattern. It is difficult to learn an overall pseudo random number (that is, the internal status of the random number generator) from this. Further, it is similarly difficult for a legitimate receiver of a certain channel to eavesdrop on another channel.

Next, consider the encoding rate. If considering the case where the bit patterns of the channels are all random and uncorrelated, the probability of the AND of an individual bit becoming "1" is $2^{-N}$. Therefore, the probably of all of the bits becoming, "0" and encryption failing becomes as follows. When L=N, the error probability is 0.37.

$$(1-2^{-N})^{2^L} \approx e^{-2^{(L-N)}} \quad \text{[Equation 4]}$$

By limiting the bit patterns, the probability of encryption failure can be lowered, so if dealing with error by a suitable method, it is relatively easy to obtain an encoding rate of 70% or more.

In a conventional encryption method using both pseudo random numbers and physical random numbers, the amount of the information sent has to be larger than the sum of the amount of information of the plaintext and the amount of information of the physical random numbers, so a drop in the encoding rate was unavoidable as a cost of security.

However, the aspect of the present embodiments is a method, like the CDMA (Code Division Multiple Access) method in communications using radio waves, which selectively decodes specific plaintext from encrypted text multiplexed using pseudo random sequences as a code. It does not use meaningless physical random numbers, so the drop in the overall encoding rate can be kept very small.

Note that not only an eavesdropper, but also the legitimate receiver may not obtain other plaintext unless knowing another pseudo random sequence. Further, even if knowing all of the plaintext for the encryption communicated, it will be difficult to deduce the pseudo random sequences since a plurality of plurality of pseudo random sequences are used for its encryption.

In this way, according to the aspect of the present embodiments, it is possible to provide a stream encryption method and encryption system able to enhance the security against known plaintext attack without causing a remarkable drop in the encoding rate of the encryption.

Below, embodiments of the stream encryption method and encryption system will be explained in detail while referring to the attached drawings.

Figure 4:
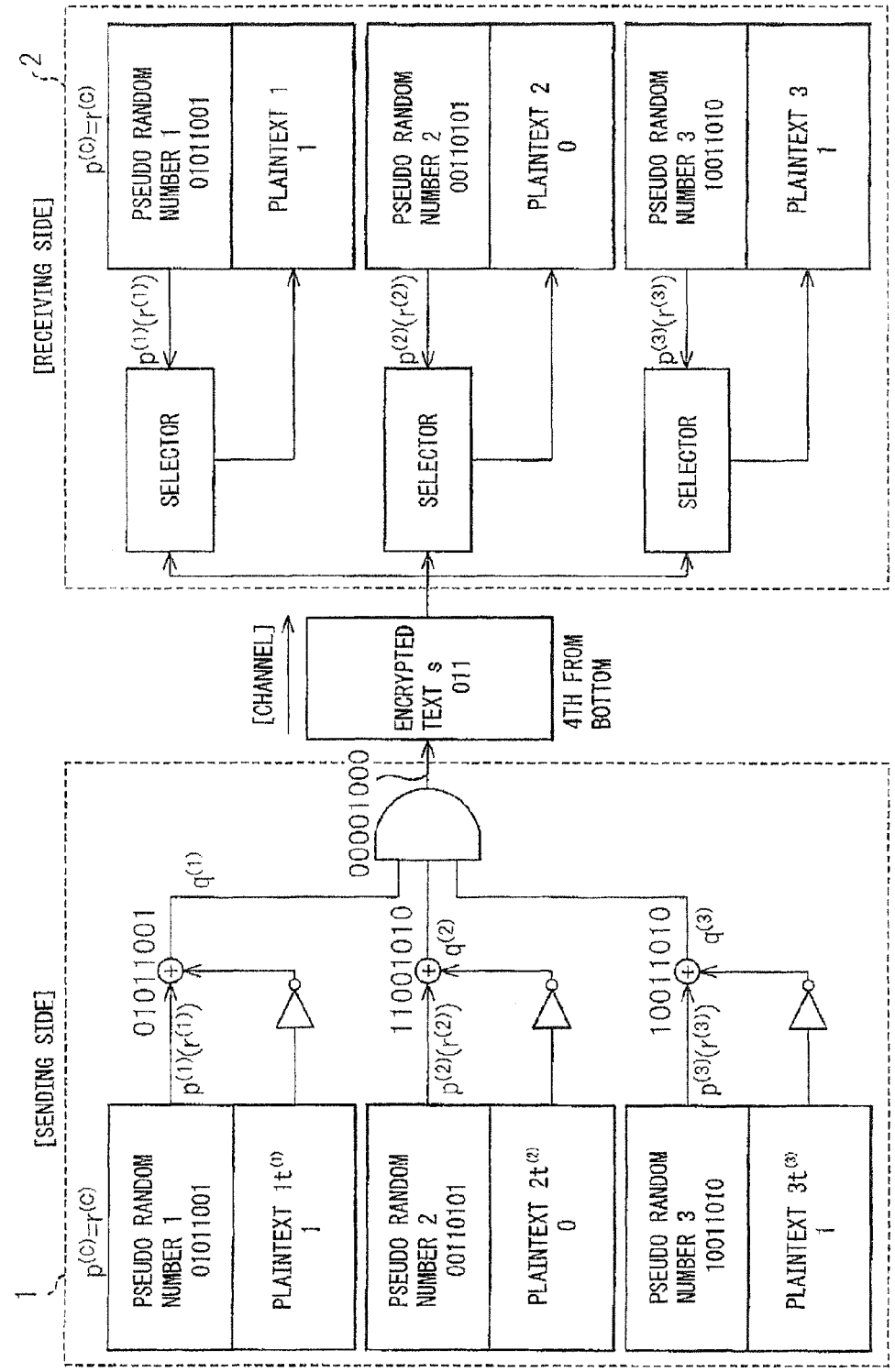
FIG. 4 is a block diagram for explaining a first embodiment of a stream encryption method.

FIG. 4 is a block diagram for explaining a first embodiment of a stream encryption method and illustrates the case of using as a $2^L$-bit bit pattern $p^{(c)}$ $2^L$ bits' worth of output $r^{(c)}$ of the random number generator as it is, that is, the case of $p^{(1)}=r^{(1)}$, $p^{(2)}=r^{(2)}$, and $p^{(3)}=r^{(3)}$.

First, an example of an encoder circuit (encryptor) 1 for obtaining a bit number of "1" from a $2^L$-bit bit pattern x will be explained. This encoder circuit is not a priority encoder. It can judge if the number of bits of "1" is 0, 1, 2, or more and outputs the corresponding bit number when the number of bits of "1" is 1.

At the encoder circuit 1, when making the $m^{(k)}$ a $2^L$-bit bit pattern comprised of a bit string with a bit number the same as the k-th bit when expressing it by a binary number as follows, $$m_j^{(k)}[j/2^k] \bmod 2 \quad \text{[Equation 5]}$$

$m^{(0)}$=0101010101010101010 . . .
$m^{(1)}$=0011001100110011000110 . . .
$m^{(2)}$=0000111100001111000001 . . .
the next value is calculated from the input bit pattern x:

$$u^{(k)} = \sum_j \overline{m}_j^{(k)} x_j \quad \text{[Equation 6]}$$

$$v^{(k)} = \sum_j m_j^{(k)} x_j$$

$$u^{(0)} = x_0 + x_2 + x_4 + x_6 + x_8 + x_{10} + \ldots \quad v^{(0)}$$
$$= x_1 + x_3 + x_5 + x_7 + x_9 + x_{11} + \ldots$$

-continued $$u^{(1)} = x_0 + x_1 + x_4 + x_5 + x_8 + x_9 + \ldots \, v^{(1)}$$
$$= x_2 + x_3 + x_6 + x_7 + x_{10} + x_{11} + \ldots$$
$$u^{(2)} = x_0 + x_1 + x_2 + x_3 + x_8 + x_9 + \ldots \, v^{(2)}$$
$$= x_4 + x_5 + x_6 + x_7 + x_{12} + x_{13} + \ldots$$
$$a = u^{(0)} + v^{(0)}$$
$$b = \sum_k u^{(k)} v^{(k)}$$

Here, "a" expresses that the bit pattern x has one or more of "1", while "b" expresses that it has two or more of "1". Further, when a=1 and b=0, the bit pattern x has just one "1". That bit number is $$v = \sum_{k=0}^{L-1} 2^k v^{(k)}$$ [Equation 7]

Using this circuit, the encryption symbols are determined as follows: First, when a=1 and b=0, v may be made the encrypted text S as it is. When b=1, x has two or more "1" and v does not describe the correct bit number. One or more of $v^{(k)}$ is "1", so the AND of the $m^{(k)}$ corresponding to that k or its negative/$m^{(k)}$ is taken for each bit of x and is made that x:

$$x_i \leftarrow x_i \cdot (m_i^{(k)} \oplus d)$$ [Equation 8]

By repeating this operation a maximum of L times, it is possible to ensure that x include at least one "1". That bit number is made the encrypted text S.

When a=0, it means encryption failure. As a method for dealing with this, various methods may be considered.

That is, the first method when encryption fails is to set in advance at least one of the $2^L$ encryption symbols as symbols expressing encryption failure and use such a symbol expressing encryption failure when a=0.

In this first method, when an encryption signals other than symbols expressing encryption failure are used, it means that the encryption is successful, so while data loss will occur, error will not occur. However, when encryption fails, loss of data occurs at all channels.

When L is 2 and 8, the number of channels and the loss rate and encoding rate become as follows:

TABLE 1

| No. of bits | No. of channels | Loss rate | Encoding rate |
|---|---|---|---|
| 2 | 1 | 0.125 | 0.4375 |
|   | 2 | 0.42188 | 0.57813 |
|   | 3 | 0.66992 | 0.49512 |
| 8 | 1 | 1.7E−77 | 0.125 |
|   | 2 | 1.4E−32 | 0.25 |
|   | 3 | 1.6E−15 | 0.375 |
|   | 4 | 7.1E−08 | 0.5 |
|   | 5 | 0.0003 | 0.62481 |
|   | 6 | 0.01803 | 0.73648 |
|   | 7 | 0.13533 | 0.75658 |
|   | 8 | 0.3686 | 0.6314 |

Specifically, from the above Table 1, it is learned that when for example L is 2 ($2^2$ bits) and the number of channels is 2, the encoding rate becomes 0.57813 and the loss rate becomes 0.42188 and, further, when L is 8 ($2^8$ bits) and the number of channels is 7, the encoding rate becomes 0.75658 and the loss rate becomes 0.13533.

Next, the second method when the encryption fails is the method of encryption excluding several channels when encryption fails and allowing the generation of error in the excluded channels. Various techniques may be considered as ways to select channels causing error, but the following technique is simple and is believed advantageous from the viewpoint of the encoding rate as well.

That is, the method does not obtain the ANDs of the bit patterns $q^{(c)}$ of the individual channels at one time, but assigns the channels priority orders and successively obtains the ANDs from the ones with the higher priority orders.

$$x^{(0)} = q^{(0)}, x^{(k)} = x^{(k-1)} \cdot q^{(k)}$$

Further, if a=0, it means that if that channel is added, the encoding will fail, so that channel is excluded, that is, the step of obtaining the AND with $q^{(k)}$ is skipped, and the step of the next channel is proceeded to.

In the above second method, even if error occurs in a certain channel, it will not affect the other channels, but error may not be detected and corrected, so it is preferable to use something enabling error detection and correction for the original data (plaintext). Further, compared with loss of data, error has a larger effect on the channel capacity, so the channel capacity does not necessarily become larger. Furthermore, the error rate differs according to the degree of priority of a channel, so the channel capacity also differs.

Furthermore, a third method when encryption fails is a combination of the above first and second methods.

That is, for example, it is possible to assign each channel a priority order, send a symbol of encoding failure when error occurs in several channels from the ones with high priority orders, successively obtain ANDs for the remaining channels, and, when a=0, skip those channels. Due to this, it is possible to reduce the data loss rate of channels with high priority orders.

Further, a fourth method when encryption fails divides the $2^L$ encryption symbols into several groups and switches between the groups according to at what channel the error occurs so as to enable correction.

Note that in the fourth method as well, it is possible to set symbols describing failure of encryption. Further, the length of $q^{(c)}$ becomes shorter, so the probability of the AND of all channels all becoming "0" rises, but correction is possible, so the overall loss rate and error rate become substantially equal. Furthermore, the fourth method has the advantage that the bit pattern can be shortened, but the effect of jumbling the data by multiplexing falls.

Figure 5:
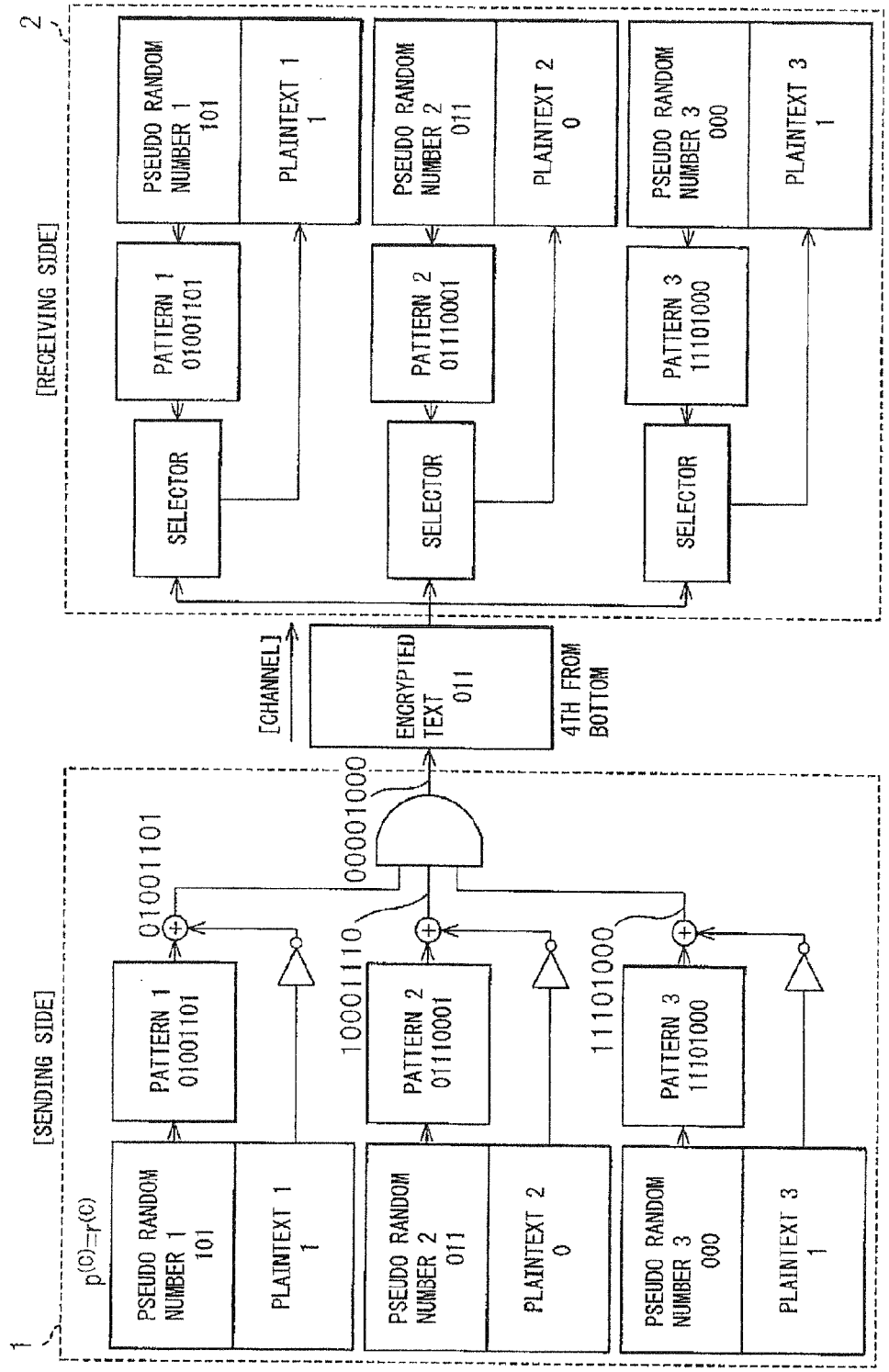
FIG. 5 is a block diagram for explaining a second embodiment of a stream encryption method.

FIG. 5 is a block diagram for explaining a second embodiment of a stream encryption method.

As illustrated in FIG. 5, in the second embodiment, a circuit (realized by a ROM etc.) is used for mapping from $r^{(c)}$ to $p^{(c)}$. If using as $p^{(c)}$ a bit pattern where the numbers of "0" and "1" become substantially the same, then the selection as $q^{(c)}$ of a pattern with a large number of "0"s and easier occurrence of error can be avoided, so the probability of success in encryption, particularly when the number of channels is small, can be raised.

Further, even if $p_s^{(c)}$ ends up becoming known by a known plaintext attack, the specific bits of $r^{(c)}$ will not end up becoming known from that, so deduction of the random sequences will become more difficult. To make deduction of $r^{(c)}$ from $p^{(c)}$ difficult, it is preferable that the mapping from $r^{(c)}$ to $p^{(c)}$ be nonlinear.

Next, a third embodiment of the stream encryption method will be explained. The third embodiment of this stream encryption method is one using a ternary $p^{(c)}$. Here, $p^{(c)}$ is preferably a pattern where the numbers of "−1" and "1" are substantially the same.

That is, by $q_i^{(c)} = p_i^{(c)} \times (2t^{(c)} - 1)$, the patterns of the channels are determined. First, a bit pattern obtained by making "1" only the parts of $q^{(c)}$ which are "1" is used to narrow down the encryption symbols, but if failing, a pattern obtained by making "1" the parts of $q^{(c)}$ not "−1" is used to narrow down the encryption symbols.

Figure 6:
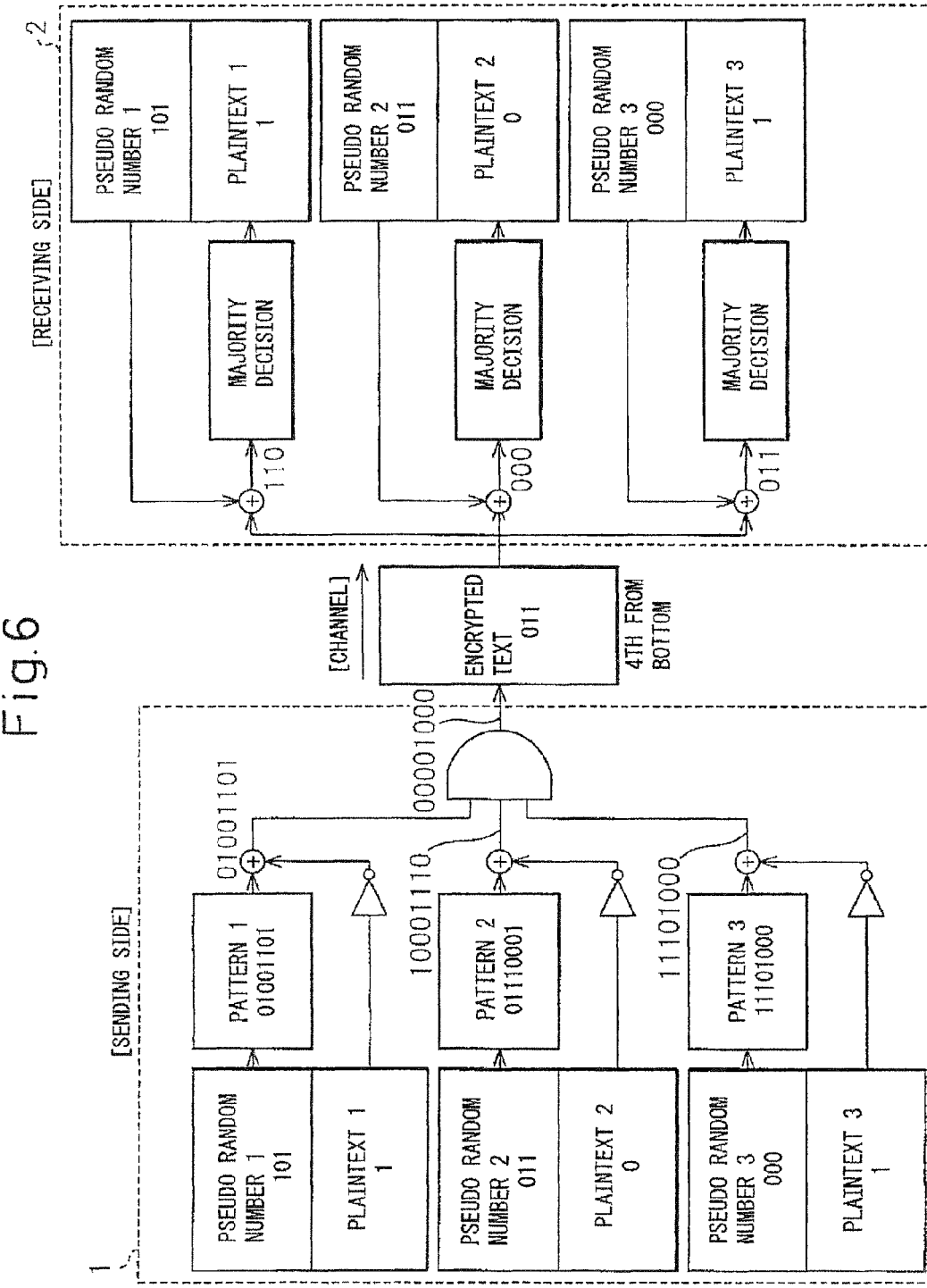
FIG. 6 is a block diagram for explaining a fourth embodiment of a stream encryption method.

FIG. 6 is a block diagram for explaining a fourth embodiment of a stream encryption method. This fourth embodiment is one using the Hamming distance as the technique for mapping in the above second and third embodiments.

First, for simplification, consider the case where L is an odd number. The technique is used of determining if $p^{(c)}$ is "0" or "1" according to whether the Hamming distance of the L bits' worth of the pseudo random sequence $r^{(c)}$ and the bit numbers is larger than L/2:

$$p_i^{(c)} = \begin{cases} 0 & d(r^{(c)}, i) < L/2 \\ 1 & d(r^{(c)}, i) > L/2 \end{cases} \quad \text{[Equation 9]}$$

The (encryption is the same as in the above-mentioned second embodiment, but decoding can also be easily performed. That is, it is possible to obtain the plaintext by entering the XOR of each bit of the encrypted text S and the pseudo random sequence into a majority decision circuit:

Next, when L is an even number, by using the following:

$$p_i^{(c)} = \begin{cases} -1 & d(r^{(c)}, i) < L/2 \\ 0 & d(r^{(c)}, i) = L/2 \\ 1 & d(r^{(c)}, i) > L/2 \end{cases} \quad \text{[Equation 10]}$$

a ternary pattern can be generated. The decoding can judge "0", "1", and "loss" by using an even number input majority decision circuit.

Further, the Hamming distance does not have to be calculated for all of the L bits. It is also possible to use a mask bit pattern where only M bits of part of the L bits are "1"

$$p_i^{(c)} = \begin{cases} 0 & d(r^{(c)} \cdot m^{(c)}, i \cdot m^{(c)}) < M/2 \\ 1 & d(r^{(c)} \cdot m^{(c)}, i \cdot m^{(c)}) > M/2 \end{cases} \quad \text{[Equation 11]}$$

$$p_i^{(c)} = \begin{cases} -1 & d(r^{(c)} \cdot m^{(c)}, i \cdot m^{(c)}) < M/2 \\ 0 & d(r^{(c)} \cdot m^{(c)}, i \cdot m^{(c)}) = M/2 \\ 1 & d(r^{(c)} \cdot m^{(c)}, i \cdot m^{(c)}) > M/2 \end{cases}$$

By doings this, regardless if L is odd or even, it is possible to generate a binary or ternary $p^{(c)}$. Note that the mask bit pattern may be fixed, but may also be determined in accordance with pseudo random numbers.

Next, a fifth embodiment of the stream encryption method will be explained. The fifth embodiment of this stream encryption method makes the code length L of the encryption symbols variable.

Like the first technique of the first embodiment explained above, for example, when using encryption failure symbols, the data which had attempted to be sent is sent using the next encryption symbols, so this may de facto be considered a variable code length, but here a separate embodiment will be explained.

First, in the same way as the above-explained first embodiment, a pseudo random sequence $r^{(c)}$ is used as it is as $p^{(c)}$. However, each time 1 bit of the pseudo random sequence $r^{(c)}$ is generated, the ANDs of all the $q_i^{(c)}$ of all of the channels are taken, the bit number where the result first becomes "1" is made the transmitted data, and the counter is reset.

Here, it is poor in efficiency to send a bit number as it is, so for example an upper limit is set on the bit number and Huffman encoding etc. is used for compression before encryption. The amount of information of data sent when the number of channels is N is $N - (2^N - 1)\log_2(1 - 2^{-N})$, so if N is large and the compression is performed sufficiently efficiently, an encoding rate of about $N/(N + \log_2 e)$ can be expected.

Figure 7:
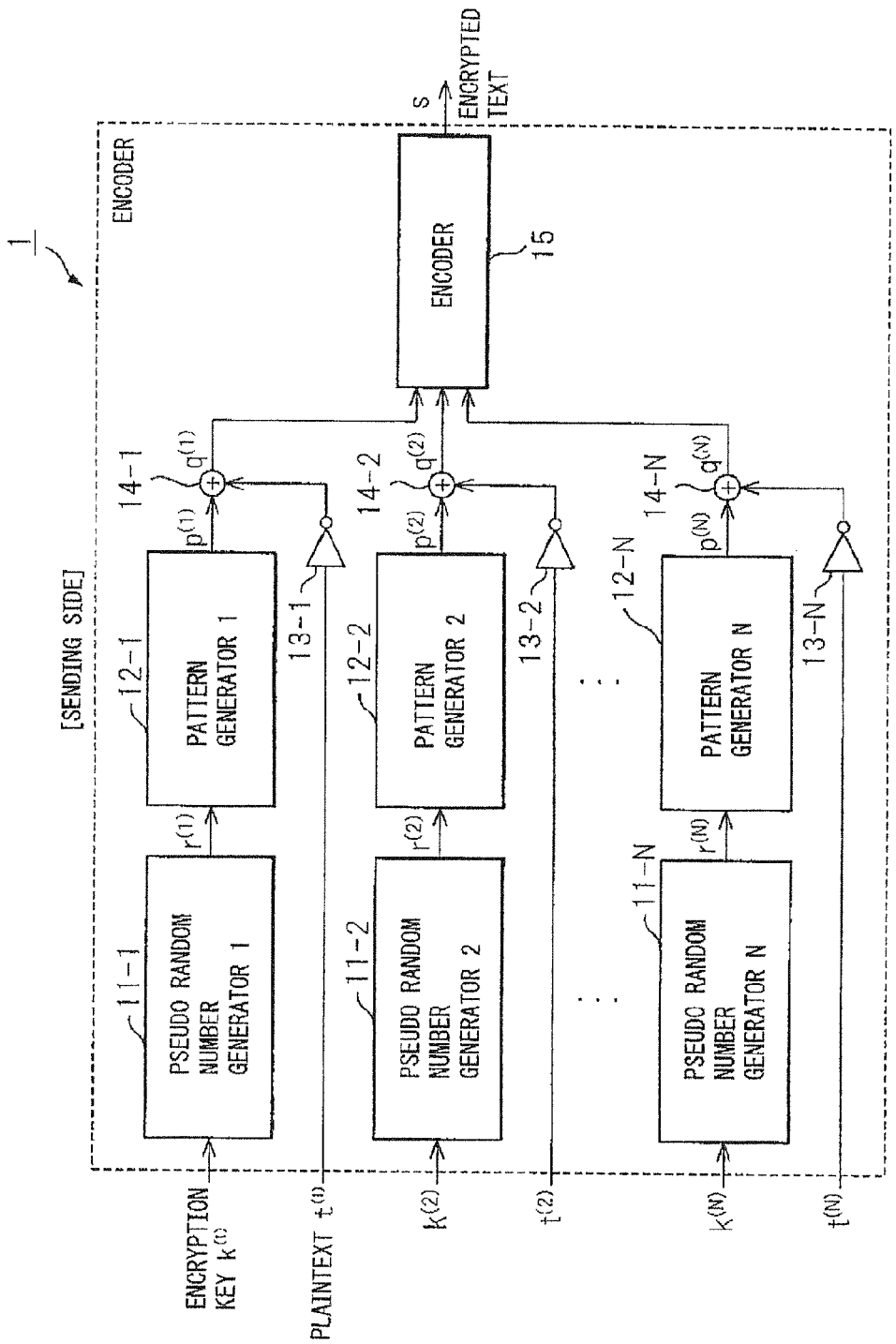
FIG. 7 is a block diagram describing an example of an encryptor (encoder) in a stream encryption system.
Figure 8:
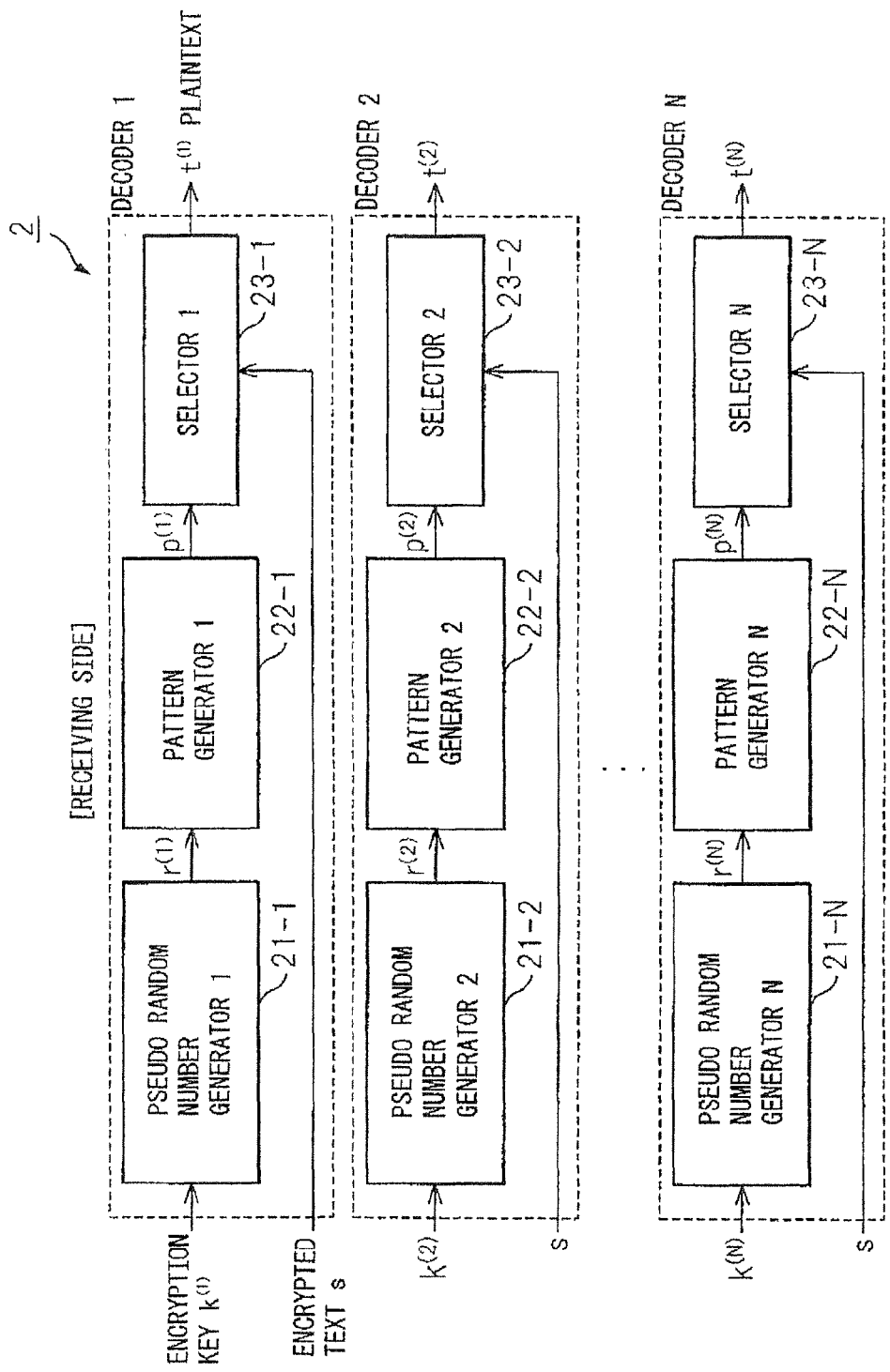
FIG. 8 is a block diagram describing an example of a decoder in a stream encryption system.

FIG. 7 is a block diagram describing an example of an encryptor (encoder) in a stream encryption system, while FIG. 8 is a block diagram describing an example of a decoder in a stream encryption system. Note that the encryptor illustrated in FIG. 7 and the decoder illustrated in FIG. 8 correspond to the second embodiment of the stream encryption method illustrated in FIG. 5.

The encryptor 1 is provided with, in each of the N number of channels, a pseudo random number generator 11 (11-1 to 11-N) generating an $r^{(c)}$ ($r^{(1)}$ to $r^{(N)}$) corresponding to an encryption key $k^{(c)}$ ($k^{(1)}$ to $k^{(1)}$), a pattern generator 12 (12-1 to 12-N) generating a $p^{(c)}$ ($p^{(1)}$ to $p^{(N)}$) from $r^{(c)} r^{(1)}$) to $r^{(N)}$), an inverter 14 (14-1 to 14-N) inverting the plaintext t ($t^{(1)}$ to $t^{(N)}$), an adder 14 (14-1 to 14-N) adding the outputs of the pattern generator 12 (12-1 to 12-N) and output of the inverter, and an encoder 15 encoding the bit pattern $q^{(c)}$ ($q^{(1)}$ to $q^{(N)}$) for each of the channels 1 to N output from the adder 14 (14-1 to 1-4N) and outputting encrypted text S. This encrypted text S is sent via various communication lines (channels) to the receiving side decoder 2.

The decoder 2 is provided with, in each of the N number of channels, a pseudo random number generator 21 (21-1 to 21-N) generating an $r^{(c)}$ ($r^{(1)}$ to $r^{(N)}$) in accordance with an encryption key $k^{(c)}$ ($k^{(1)}$ to $k^{(N)}$), a pattern generator 22 (22-1 to 22-N) generating a $p^{(c)}$ ($p^{(1)}$ to $p^{(N)}$) from $r^{(c)}$ ($r^{(1)}$ to $r^{(N)}$), and a selector 23 (23-1 to 23-N) selecting the value of the bit number designated by the encrypted text S in accordance with the output of the pattern generator 22 (22-1 to 22-N). Here, the output $r^{(c)}$ ($r^{(1)}$ to $r^{(N)}$) of the pseudo random number generator 21 (21-1 to 21-N) and the output $p^{(c)}$ ($p^{(1)}$ to $p^{(N)}$) of the pattern generator 22 (22-1 to 22-N) in the decoder 2 are the same as the outputs of the pseudo random number generator 11 (11-1 to 11-N) and pattern generator 12 (12-1 to 12-N) in the encryptor 1 due to the same encryption key $k^{(c)}$ ($k^{(1)}$ to $k^{(N)}$).

Note that the encryptor and encoder (encryption system) of FIG. 7 and FIG. 8 are just examples and can be changed in various ways in accordance with the above embodiments and their modifications needless to say.

As explained in detail above, the encryption method and encryption system are based on the technical idea of using a pseudo random sequence to divide a set of encryption symbols into two and selecting one according to the plaintext data successively for each channel so as to narrow down the candidates for the encryption symbols and employing the finally remaining ones.

However, various techniques may be considered regarding the method of division, the handling of error, etc. The explanations of the above embodiments are just examples. Various configurations may be applied in addition to the above embodiments needless to say.

Furthers by applying the present embodiments, it is possible to provide an encryption method and encryption system which can encrypt mutually independent input signals and pseudo random sequences together for each bit and which make deduction of a pseudo encryption sequence harder even by a known plaintext attack while suppressing the drop in the encoding rate.

Note that the present embodiments can also be applied to a storage system using the above stream encryption method to store in advance N number of independent content and enabling a user to take out only licensed content using a corresponding encryption key.

According to the present embodiments, it is possible to provide a stream encryption method and encryption system able too enhance security against known plaintext attack without causing a remarkable drop in the encoding rate of the encryption.

All examples and conditional language recited herein are intended for pedagogical purposes to aid the reader in understanding the invention and the concepts contributed by the inventor to furthering the art, and are to be construed (s being without limitation to such specifically recited examples and conditions, nor does the organization of such examples in the specification relate to a showing of the superiority and inferiority of the invention.

Although the embodiments of the present invention have been described in detail, it should be understood that the various changes, substitutions, and alterations could be made hereto without departing from the spirit and scope of the invention.

What is claimed is:

1. A stream encryption method using an encryptor and a decoder, wherein
the encryptor performs:
generating a $2^L$-bit long bit pattern (L is N or more) for every channel of N channels by using N number of pseudo random sequences for respective channel of the N channels;
determining the bit pattern generated for the respective channel of the N channels whether to apply the bit pattern as it is or apply the bit pattern inverted by using independently a plaintext of N number of 1-bit input signal sequences;
calculating a logical product of the respective bit of the bit pattern determined whether to apply the bit pattern as it is or apply the bit pattern inverted;
generating a L-bit encryption symbol corresponding to a number of a bit where the result of calculation of the logical product is "1"; and
outputting the generated encryption symbol to the decoder, and
the decoder performs:
inputting the encryption symbol output from the encryptor;
selecting a number of the bit indicated by the encryption symbol input by the encryptor among the bit pattern generated by the N number of pseudo random sequences; and
decoding independently the plaintext input to the encryptor to a plaintext for respective channel by using the same pseudo random sequences used in the encryptor.

2. The stream encryption method as claimed in claim 1, wherein
in the generating the encryption symbol corresponding to the number of the bit where the result of calculation of the logical product is "1," when the number of the bit where the result of calculation of the logical product is "1" is one or more, an encryption symbol corresponding to one of the number of the bit is generated.

3. The stream encryption method as claimed in claim 1, wherein
in the generating the encryption symbol corresponding to the number of the bit where the result of calculation of the logical product is "1," when the number of the bit where the result of calculation of the logical product is "1" is not even one, the encryption signal includes a symbol expressing encoding failure.

4. The stream encryption method as claimed in claim 1, wherein
the calculating the logical product of the respective bit of the bit pattern includes:
carrying out a logical product of a previously calculated logical product and a bit pattern for a newly added channel in a predetermined order;
monitoring the logical product; and
skipping a process of the logical product for the bit pattern of the newly added channel, when a bit being set to "1" is not even one among the bit pattern.

5. The stream encryption method as claimed in claim 1, wherein
the calculating the logical product of the respective bit of the bit pattern includes:
carrying out a logical product of a previously calculated logical product and a bit pattern for a newly added channel in a predetermined order;
monitoring the logical product; and
determining the encryption signal to a symbol expressing encoding failure or skipping a process of carrying out the logical product of the bit pattern for the newly added channel, when a bit being set to "1" is not even one among the bit pattern.

6. The stream encryption method as claimed in claim 1, wherein the stream encryption method further comprising:
using a first bit pattern of the respective bit being set to a ternary "−1, 0, 1" as the bit pattern for the respective channel;
determining the first bit pattern generated for the respective channel of the N channels whether to apply the first bit pattern as it is or apply the first bit pattern inverted by using independently a plaintext of N number of 1-bit input signal sequences;
generating a second bit pattern of binary and a third bit pattern of binary, for the first bit pattern determined by whether to apply that the first bit pattern as it is or apply the first bit pattern inverted, wherein
the value "1" of the first bit pattern is converted to a value "1" of the second bit pattern, and the value "−1" or "0" of the first bit pattern is converted to a value "0" of the second bit pattern, and
the value "0" or "1" of the first bit pattern is converted to a value "1" of the third bit pattern, and the value "−1" of the first bit pattern is converted to a value "0" of the third bit pattern;
carrying out a logical product for all channels of the second bit pattern, wherein when a bit being set to "1" in the logical product exists, an encryption symbol corresponding to a number of the bit being set to "1" in the logical product is calculated, and when a bit being set to "1" in the logical product does not exist, loss of data for the channel using the third bit pattern is enabled to occur by carrying out a logical product for some channels of the third bit pattern and by calculating an encryption symbol corresponding to a number of the bit being set to "1" in the logical product; and reducing a frequency of error reaching another signal sequence.

7. The stream encryption method as claimed in claim 1, wherein the generating the bit pattern used for the generating the encryption symbol comprises:

carrying out a logical product for an exclusive or of a pseudo random number and the encryption symbol corresponding to the number of the bit; and determining the respective bit of the bit pattern to a value "0" or "1" in accordance with the number of "1" of the resultant bit pattern.

8. The stream encryption method as claimed in claim 1, wherein a bit number L of encryption symbols is made variable so as to improve an encoding rate.

9. A stream encryption system including an encryptor and a decoder, wherein the encryptor performs:

generating a $2^L$-bit long bit pattern (L is N or more) for every channel of N channels by using N number of pseudo random sequences for respective channel of the N channels;

determining the bit pattern generated for the respective channel of the N channels whether to apply that the bit pattern as it is or apply the bit pattern inverted by using independently a plaintext of N number of 1-bit input signal sequences;

calculating a logical product of the respective bit of the bit pattern determined whether to apply that the bit pattern as it is or apply the bit pattern inverted;

generating a L-bit encryption symbol corresponding to a number of a bit where the result of calculation of the logical product is "1"; and outputting the generated encryption symbol to the decoder, and the decoder performs:

inputting the encryption symbol output from the encryptor;

selecting a number of the bit indicated by the encryption symbol input by the encryptor among the bit pattern generated by the N number of pseudo random sequences; and decoding independently the plaintext input to the encryptor to a plaintext for respective channel by using the same pseudo random sequences used in the encryptor.

10. A method of enabling a user to take out only licensed content using a corresponding encryption key from N number of previously stored independent content by using a stream encryption method, wherein the stream encryption method uses an encryptor and a decoder, wherein the encryptor performs:

generating a $2^L$-bit long bit pattern (L is N or more) for every channel of N channels by using N number of pseudo random sequences for respective channel of the N channels;

determining the bit pattern generated for the respective channel of the N channels whether to apply that the bit pattern as it is or apply the bit pattern inverted by using independently a plaintext of N number of 1-bit input signal sequences;

calculating a logical product of the respective bit of the bit pattern determined whether to apply that the bit pattern as it is or apply the bit pattern inverted;

generating a L-bit encryption symbol corresponding to a number of a bit where the result of calculation of the logical product is "1"; and outputting the generated encryption symbol to the decoder, and the decoder performs:

inputting the encryption symbol output from the encryptor;

selecting a number of the bit indicated by the encryption symbol input by the encryptor among the bit pattern generated by the N number of pseudo random sequences; and decoding independently the plaintext input to the encryptor to a plaintext for respective channel by using the same pseudo random sequences used in the encryptor.

* * * * *